UNITED STATES PATENT OFFICE.

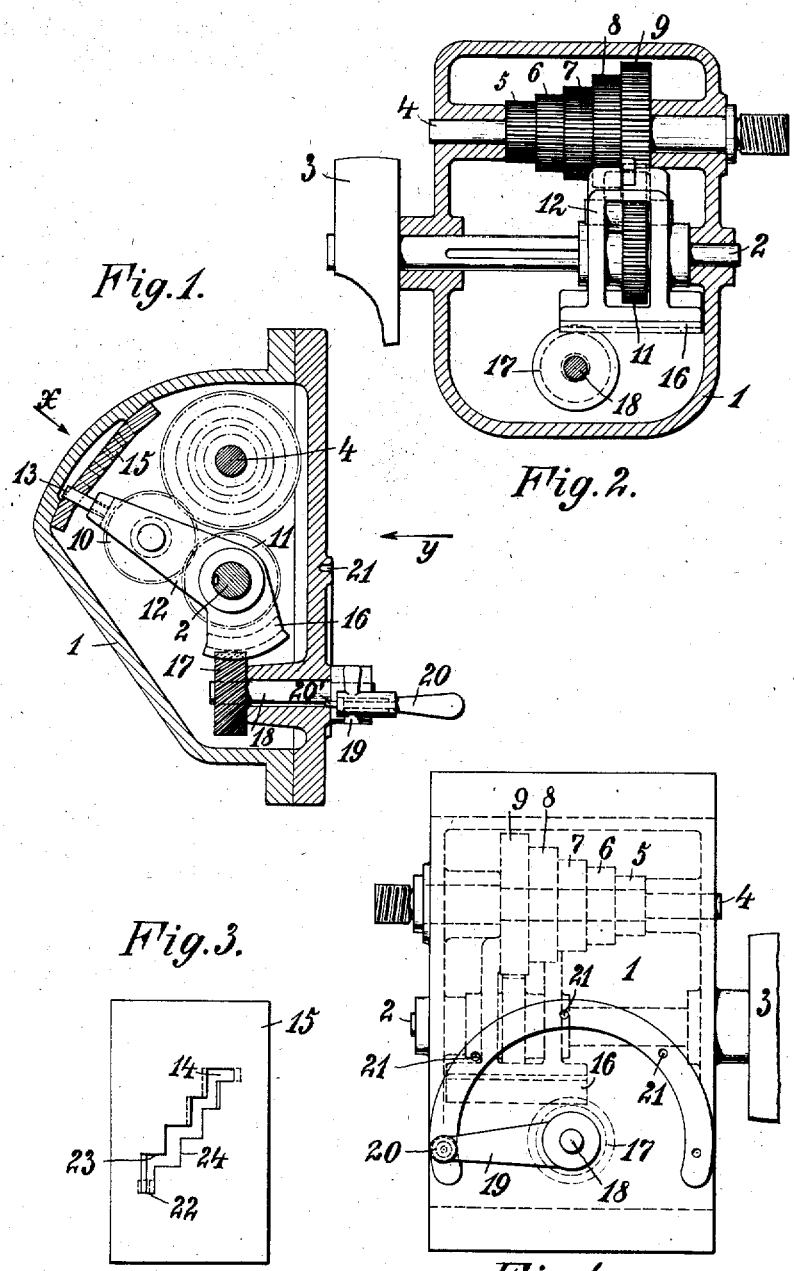

RICHARD STUHLMACHER, OF REICHENBRAND, NEAR CHEMNITZ, GERMANY, ASSIGNOR TO WANDERER-WERKE VORMALS WINKLHOFER UND JAENICKE AKTIEN-GESELLSCHAFT, OF SCHÖNAU, NEAR CHEMNITZ, GERMANY.

DRIVING-GEAR MECHANISM.

986,241.  Specification of Letters Patent.  Patented Mar. 7, 1911.

Application filed September 29, 1910. Serial No. 584,537.

*To all whom it may concern:*

Be it known that I, RICHARD STUHLMACHER, subject of the German Emperor, residing at Reichenbrand, near Chemnitz, in the Kingdom of Saxony, Germany, have invented certain new and useful Improvements in Driving-Gear Mechanism, of which the following is a specification.

The invention has for its object to provide a mechanism for producing speed changing movements and more particularly for converting uniform movement into a zigzag movement.

A mechanism of this kind can be usefully employed in practice, for instance in connection with a change-speed gearing and in this form is illustrated by way of example in the accompanying drawing in which:

Figure 1 represents a vertical section of a gearing with the new mechanism in lateral elevation. Fig. 2 is a vertical section viewed from the front. Fig. 3 illustrates the guide as seen in Fig. 1, when viewed in the direction of the arrow *x*. Fig. 4 is a rear view of Fig. 1 viewed in the direction of the arrow *y*.

Rotatably journaled in the gear casing 1 is the driving shaft 2 of an intermediate gear. Secured to the shaft 2 is a pulley 3 and secured on a shaft 4 is the gearing train comprising the pinions 5, 6, 7, 8, 9.

The two gear wheels 10 and 11 are rotatably journaled in a member 12 which is rotatably and laterally movable on the shaft 2. The wheel 11 is arranged on the shaft 2 so as to be movable in the longitudinal direction on the shaft, but is not loosely rotatable thereon. The lever-shaped end of the member 12 is provided with a guide pin 13 engaging with a guide 15 having a zigzag groove 14 (Fig. 3). In causing the pin 13 to move in the zigzag groove 14, the member 12 is alternately displaced along the shaft 2 and moved angularly thereon repeatedly until the pin 13 has traveled through all stages in the zigzag shaped groove 14. The object of this alternating movement is in this example to cause the pinion 10 to be thrown into successive engagement with the various gear wheels 5, 6, 7, 8, 9.

Mounted on the member 12 is a downwardly depending gear segment 16 of such breadth as to remain in engagement with a gear 17, during the displacement of the member 12 on the shaft 2. The two gear members 16 and 17 form a skew gearing. The wheel 17 is fast on a shaft 18 carrying at its forward end a hand crank 19. The handle 20 of this crank is provided with a spring actuated pin 20' adapted to engage with holes 21 in a segment so as to enable the crank and the wheel 17 to be locked in positions in which it is desired to effect the engagement of the pinion 10 with the various gear wheels 5, 6, 7, 8, 9.

The use and operation of this device are effected in the following manner. In the position shown in the drawing the pinion 10 is in engagement with the largest gear wheel 9. If it is desired to throw the pinion 10 into engagement with the gear wheel 8, the crank 19 is rocked from the position shown in Fig. 4, until the pin 20' snaps into the next following hole 21. By this simple rotation of the crank 19 the member 12 is caused to perform a combined movement, viz first of all a rectilinear movement in the axial direction of the shaft 2, and then an angular rotation about the shaft 2. The cause of this combined movement is the zigzag shape of the guide groove 14 and the result of this movement consists in the pinion 10 being first moved laterally out of engagement with the teeth of the gear wheel 9, and then thrown into engagement with the teeth of the gear wheel 8. The first portion of this combined movement is brought about by the guide pin 13 (Fig. 1) moving in the zigzag groove from the point 22 to the point 23 (Fig. 3). During this first partial movement the wheel 17 acts on the segment 16 in the same manner as if 16 were not a cylindrical pinion but a straight rack. The second part of the combined movement is produced by the guide pin 13 (Fig. 1) being caused to move in the zigzag groove from the point 23 to point 24 (Fig. 3). During this second partial movement the wheel 17 acts on the segment 16 in an ordinary manner, that is to say the segment 16 is rotated about the shaft 2. Thus in moving the crank 19 uniformly from the position shown in Fig. 4, along the semi-circular segment 21, it will be seen that this rotary movement is converted into a zigzag movement of the member 12 guided by the pin 13 in the groove 14 being alternately displaced and rotated on the shaft 2, as will be readily understood.

What I claim and desire to secure by Letters Patent is:

1. In driving gear mechanism the combination of a guide, a member coöperating with the said guide, a skew gear for operating the said member and means for operating the said skew gear so as to cause the said member to travel along the turns of the said guide, substantially as set forth.

2. In driving gear mechanism the combination of a guide, a member coöperating with the said guide, a gear carrier connected to the said member, a skew gear element connected to the said carrier, a skew wheel coöperating with the said gear element and means for uniformly rotating said wheel to a determined extent thereby causing the said member to travel along determined turns of the said guide, substantially as set forth.

3. In driving gear mechanism the combination of a guide, a member coöperating with the said guide, a shaft, a gear carrier movable on and rotatable on the shaft, a pinion mounted to move on said shaft and to rotate therewith, a gear element on the said carrier and a driven wheel engaging with the said gear element all substantially as described.

4. In driving gear mechanism the combination of a guide, a member coöperating with the said guide, a shaft, a gear carrier movable on and rotatable on the shaft, a pinion mounted to move on said shaft and to rotate therewith, a gear element on the said carrier and a driven wheel engaging with the said gear element, and a number of gears with which the said pinion is caused to successively engage for the purpose set forth.

In testimony whereof I have affixed my signature in presence of two witnesses.

RICHARD STUHLMACHER. [L. S.]

Witnesses:
 WM. WASHINGTON BRUNSWICK,
 MAX J. BENNDORF.